US012366827B2

(12) United States Patent
Leskerpit et al.

(10) Patent No.: US 12,366,827 B2
(45) Date of Patent: Jul. 22, 2025

(54) TIME ZONE CORRECTION MECHANISM FOR A TIMEPIECE

(71) Applicant: Blancpain SA, Le Brassus (CH)

(72) Inventors: Julien Leskerpit, Pontarlier (FR); Bernat Monferrer, St-Prex (CH)

(73) Assignee: Blancpain SA, Le Brassus (CH)

( * ) Notice: Subject to any disclaimer, the term of this patent is extended or adjusted under 35 U.S.C. 154(b) by 420 days.

(21) Appl. No.: 17/820,365

(22) Filed: Aug. 17, 2022

(65) Prior Publication Data

US 2023/0081323 A1 Mar. 16, 2023

(30) Foreign Application Priority Data

Sep. 10, 2021 (EP) .................................... 21196128

(51) Int. Cl.
*G04B 19/02* (2006.01)
*G04B 13/02* (2006.01)
*G04B 19/25* (2006.01)

(52) U.S. Cl.
CPC ............ *G04B 19/02* (2013.01); *G04B 13/02* (2013.01); *G04B 19/25* (2013.01)

(58) Field of Classification Search
None
See application file for complete search history.

(56) References Cited

U.S. PATENT DOCUMENTS 6,270,251 B1 * 8/2001 Bron .................... G04B 27/004 368/320
2019/0025761 A1 * 1/2019 Chabloz ................. G04B 13/00

FOREIGN PATENT DOCUMENTS

CA 2340818 A1 9/2001
CH 695799 A5 8/2006
CH 699 785 A2 4/2010
CH 701671 A2 * 2/2011 ........... G04B 27/001
CN 1101436 A 4/1995
(Continued)

OTHER PUBLICATIONS

European Search Report Issued Feb. 18, 2022 in European Application 21196128.9 Filed on Sep. 10, 2021 (with English Translation of Categories of Cited Documents), 3 pages.
(Continued)

*Primary Examiner* — Regis J Betsch
*Assistant Examiner* — Michael James Walker
(74) *Attorney, Agent, or Firm* — Oblon, McClelland, Maier & Neustadt, L.L.P.

(57) ABSTRACT

A timepiece time zone correction mechanism is equipped with a manual control device including two counteracting manual corrector actuators setting in motion a time zone corrector associated therewith including a beak which is configured to bear against a relief of a time zone correction wheel assembly and to cause the assembly to move. The assembly includes a regularly spaced toothing having a first drive level from which a plurality of successive teeth are missing and replaced by a first clearance, and a second drive level parallel to the first drive level, and from which a plurality of successive teeth are missing and replaced by a second clearance. The first clearance and the second clearance are not superimposed with one another. Each time zone corrector cooperates with a single drive level, from among the first drive level and the second drive level, of the time zone correction wheel assembly.

15 Claims, 8 Drawing Sheets

(56) References Cited

FOREIGN PATENT DOCUMENTS

| | | | | | |
|---|---|---|---|---|---|
| CN | 101620407 | A | * | 1/2010 | ........... G04B 19/247 |
| CN | 105824229 | A | | 8/2016 | |
| EP | 2 790 069 | A2 | | 10/2014 | |
| EP | 2 790 069 | A3 | | 10/2014 | |

OTHER PUBLICATIONS

Office Action issued Apr. 10, 2025, in corresponding CN Application No. 2022111029489 (with machine translation).

* cited by examiner

TIME ZONE CORRECTION MECHANISM FOR A TIMEPIECE

CROSS-REFERENCE TO RELATED APPLICATION

This application claims priority to European Patent Application No. 21196128.9 filed on Sep. 10, 2021, the entire disclosure of which is hereby incorporated herein by reference.

TECHNICAL FIELD OF THE INVENTION

The invention relates to a time zone correction mechanism for a timepiece, equipped with a manual control device comprising manual corrector actuators arranged to be operated by a user and to control movements of one and the same correction wheel assembly in opposite directions.

The invention further relates to a timepiece comprising at least one time zone mechanism with such a time zone correction mechanism.

The invention relates to the field of horological mechanisms, in particular complication mechanisms such as calendar mechanisms or time zone mechanisms, and the setting mechanisms associated therewith, allowing the user to adjust the time zone and/or date of the timepiece.

TECHNOLOGICAL BACKGROUND

In the horological field, it is not uncommon to propose watches having complications, such as calendar mechanisms, or so-called GMT mechanisms displaying time zones, which the user can easily correct using manual corrector actuators, such as push buttons for example.

In this particular example of a time zone mechanism, watches exist with two separate push buttons for correcting the time zones in both directions (for bringing the time zone forward and backward). For example, one solution is to use two correction actuators that act on one and the same time zone correction wheel in a counteracting manner.

If this time zone correction mechanism is coupled with a calendar, the date displayed can be incorrect, if the wearer carries out a time zone correction while crossing the international date line (running through the Pacific Ocean).

SUMMARY OF THE INVENTION

The purpose of this invention is to prevent the wearer of a watch from making an unreliable time zone or date correction when passing the international date line.

The invention aims to enable a time zone correction to be carried out in any time zone configuration, in particular in the vicinity of the international date line.

The invention will be illustrated and described hereinbelow via a non-limiting application in the case of a time zone correction mechanism comprising manual corrector actuators, for example two push buttons.

For this purpose, the invention relates to a time zone correction mechanism for a timepiece, equipped with a manual control device comprising manual corrector actuators arranged to be operated by a user and to control movements of one and the same correction wheel assembly in opposite directions, according to claim 1.

In addition to the features mentioned in the preceding paragraph, the time zone correction mechanism for a timepiece according to the invention can have one or more complementary features from among the following, considered either on an individual basis or according to any combination technically possible:

- said first clearance and said second clearance are, when projected onto a plane, separated by a plurality of complete teeth of said time zone correction wheel assembly which extend over both said first drive level and said second drive level;
- a first time zone corrector, associated with a first manual corrector actuator, is configured to cooperate with said time zone correction wheel assembly at the first drive level and a second time zone corrector associated with a second manual corrector actuator is configured to cooperate with said time zone correction wheel assembly at the second drive level;
- the first drive level and the second drive level of the time zone correction wheel assembly each comprise at least one less tooth than the number of time zones managed by the timepiece that comprises said time zone correction mechanism;
- the first drive level and the second drive level of the time zone correction wheel assembly each comprise 23 teeth when the number of time zones managed by the timepiece that comprises said time zone correction mechanism is 24;
- said time zone correction wheel assembly is made in one piece;
- the manual control device comprises a locking lever mechanism arranged to prohibit an action by one of the two manual corrector actuators on said time zone correction wheel assembly when the other one of the two manual corrector actuators is engaged and interacting with said time zone correction wheel assembly;
- the locking lever mechanism comprises a locking lever configured to be driven in rotation during the engagement of one of the two manual corrector actuators, to limit the travel of the other one of the two counteracting manual corrector actuators, and to prevent the time zone corrector associated therewith from accessing said time zone correction wheel assembly;
- the locking lever constitutes a safety lever, said locking lever comprising a first end having a first stop finger and a second end, opposite the first end, which has a second stop finger, the first and the second stop fingers being configured to cooperate in abutment, respectively with a manual corrector actuator from among the two manual corrector actuators;
- the first stop finger and the second stop finger have an identical shape and/or carry out an identical function;
- each of the two manual corrector actuators comprises:
  - a first bearing profile configured to form a stop profile in cooperation with the first stop finger or the second stop finger and to prevent said manual corrector actuator considered from rotating;
  - a second bearing profile configured to form an escapement profile on which the first stop finger or the second stop finger slides so as to allow said manual corrector actuator considered to partially rotate;
- the first bearing profiles of the two manual corrector actuators are arranged relative to one another in a substantially aligned manner, and the first stop finger and the second stop finger respectively bear against said first bearing profile of each of said two manual corrector actuators when each of said two manual corrector actuators are actuated simultaneously by the user;
- the second bearing profiles of said two manual corrector actuators are arranged opposing one another so as to form an acute angle with the vertex of the acute angle pointing towards the time zone correction mechanism.

The invention further relates to a timepiece comprising at least one time zone mechanism with such a time zone correction mechanism.

The invention further relates to a timepiece comprising a date mechanism equipped with a date wheel assembly and a mechanism for displaying time information cooperating with the date mechanism and the time zone mechanism.

BRIEF DESCRIPTION OF THE FIGURES

The purposes, advantages and features of the invention will be better understood upon reading the following detailed description given with reference to the accompanying drawings, in which:

FIG. 7 shows a first case where the correctors are actuated at the same time. When the manual corrector actuators are actuated at the same time, they come into contact with the safety lever. As each manual corrector actuator exerts an opposite action to the other on the safety lever, the rotation thereof is blocked. The only way to carry out a correction is to release one of the manual corrector actuators. In such a case, the two corrector beaks cannot interact with the correction wheel assembly when they are actuated at the same time;

FIGS. 8 and 9 show a second case, where the correctors are actuated one after the other;

FIG. 8 shows a first stage, wherein a first corrector on the left-hand side in the figure, which acts in the direction of an increasing correction, is actuated by the first manual corrector actuator, until the corrector beak comes into contact with a tooth of the toothing of the correction wheel assembly; in this position, the first corrector has driven the safety lever over the maximum travel thereof: the distance between the safety lever and the second manual corrector actuator is very small and prevents the rotation thereof;

FIG. 9 shows the continuation of the movement, if the user continues to push the first manual corrector actuator until driving the correction wheel assembly. The safety lever remains in the same position and prevents the rotation of the second manual corrector actuator. The two corrector beaks cannot interact with the correction wheel assembly at the same time;

In all figures, common elements bear the same reference numerals unless indicated otherwise.

DETAILED DESCRIPTION OF THE INVENTION

Figure 13:
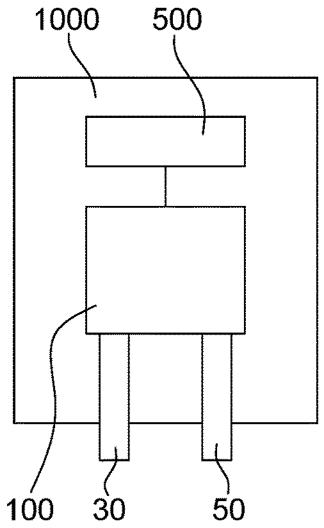
FIG. 13 is a block diagram showing a timepiece comprising a mechanism, a correction wheel assembly whereof is arranged to be controlled by such a manual control device comprising two manual corrector actuators.

As diagrammatically shown in FIG. 13, the invention relates to a time zone correction mechanism 500 for a timepiece 1000 equipped with a manual control device 100 comprising manual corrector actuators 30, 50, which are arranged to be operated by a user, and to control one and the same correction wheel assembly 10 moving in opposite directions.

Figure 1:
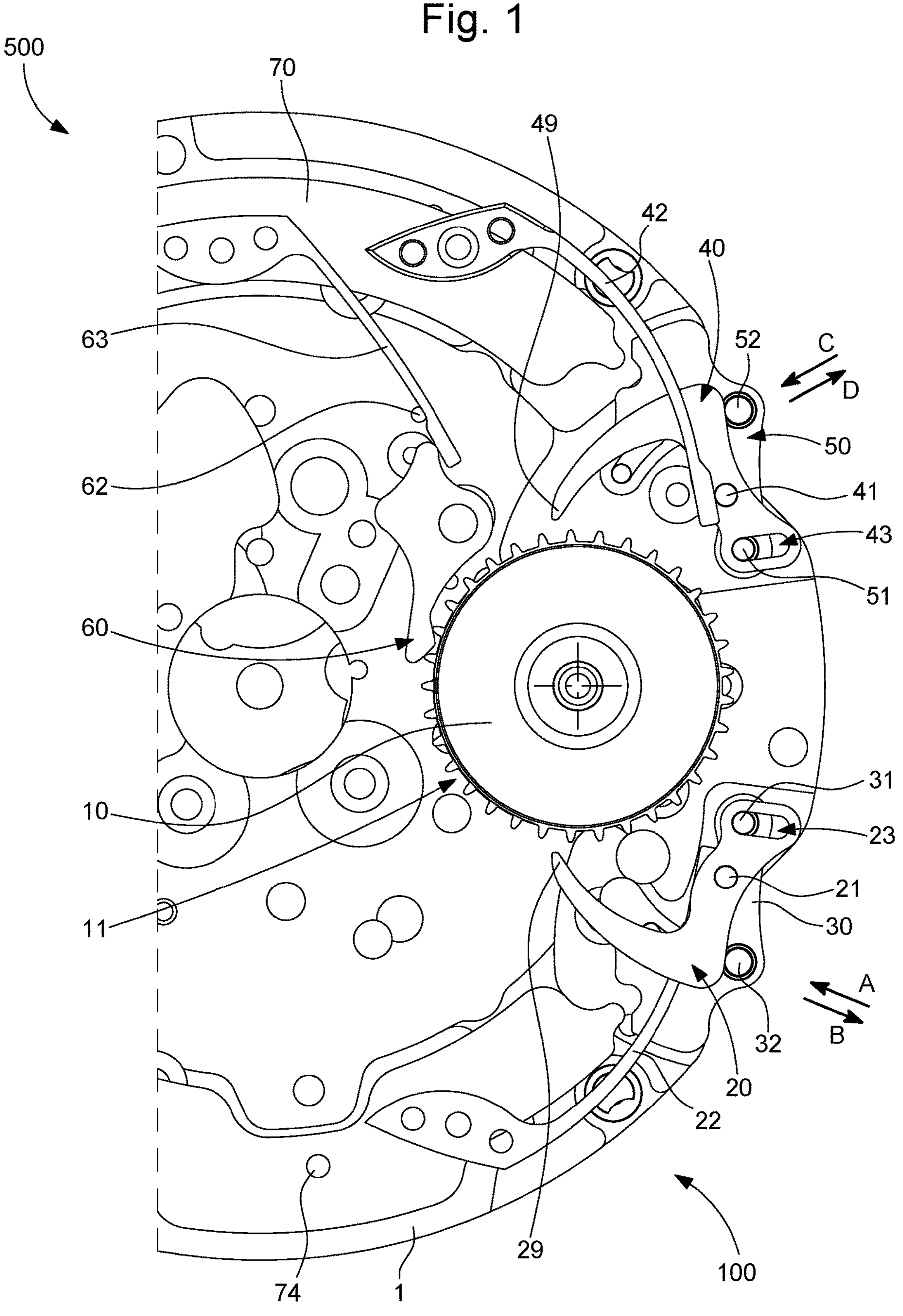
FIG. 1 diagrammatically shows a plan view of one example embodiment of a time zone correction mechanism in a rest position, comprising a correction wheel assembly that can be driven in two opposite directions by counteracting correctors operated by separate manual corrector actuators.

The invention is described here in a non-limiting application in the case of a time zone correction mechanism, shown in FIG. 1, comprising two counteracting manual corrector actuators 30, 50, which are in this case more particularly control push buttons, which tend to cause the correction wheel assembly 10, which in this case is a time zone correction wheel, to rotate in two opposite directions (clockwise and anti-clockwise).

A first manual corrector actuator 30 can be directly operated by a user via a pushing action pushing in a first direction A. The first manual corrector actuator 30 is mounted such that it pivots about a first hinge pin 31 driven into a plate 1 of the time zone correction mechanism 500, such that under the action of the user, the first manual corrector actuator 30 pivots about the first hinge pin 31.

The time zone correction mechanism 500 further comprises a first corrector 20 that is hinged relative to the first manual corrector actuator 30. To this end, the first corrector 20 comprises a first oblong guide groove 23 configured to cooperate with the first hinge pin 31 so as to allow the first corrector 20 to be hinged relative to the first manual corrector actuator 30.

The first oblong groove 23 is configured to guide the movement of the first corrector when the first manual corrector actuator 30 is pivoting, in a rotational and translational movement.

The first manual corrector actuator 30 comprises a first actuating stud 32 that is, for example, driven into the body of the first manual corrector actuator 30. The first actuating stud 32 allows the pushing action exerted on the first manual corrector actuator 30 by the user to be transmitted to the first corrector 20.

The cooperation between the first oblong groove 23 and the first hinge pin 31 limits the relative travel between the first manual corrector actuator 30 and the first corrector 20.

The first manual corrector actuator 30 tends to be pushed back, either directly or indirectly, in a second direction B that is opposite the first direction A, into an inactive rest position by a first elastic return means 22, in this case constituted by a spring, although not limited thereto.

In the example embodiment shown, the first elastic return means 22 bears against the first corrector 20, and more particularly against a first spring pin 21 driven into the body of the first corrector 20. Thus, thanks to this architecture, the first elastic return means 22 makes it possible to push back, in a second direction B opposite the first direction A, both the first corrector 20 and the first manual corrector actuator 30 into an inactive rest position.

According to an alternative embodiment, the first elastic return means 22 could also be formed by two independent return springs, a first spring acting on the first corrector 20 and a second spring acting on the first manual corrector actuator 30.

The first corrector 20 comprises a first corrector beak 29 which is arranged to cooperate with a relief of the correction wheel assembly 10, in this case formed by a time zone correction wheel. The relief of the correction wheel assembly 10 is, for example, a tooth 11 of the toothing of the correction wheel assembly 10. Advantageously, the first actuating stud 32 can also be arranged to constitute an abutment for limiting the angular travel of the first corrector 20.

According to an alternative embodiment, the correction wheel assembly 10 could be constituted by a correction star wheel or other element. In such a case, the first beak 29 is thus arranged to cooperate with a branch, an arm, a catch, or other element comprised in the correction wheel assembly 10 considered. The correction wheel assembly 10 is conventionally held in position by a correction wheel assembly jumper 60 which is subjected to the action of a jumper spring 63 bearing against a jumper pin 62.

Similarly, the second manual corrector actuator 50 can be directly operated by a user via a pushing action pushing in a third direction C. The second manual corrector actuator 50 is mounted such that it pivots about a second hinge pin 51 driven into the plate 1 of the time zone correction mechanism 500, such that under the action of the user, the second manual corrector actuator 50 pivots about the second hinge pin 51.

The time zone correction mechanism 500 further comprises a second corrector 40 that is hinged relative to the second manual corrector actuator 50. To this end, the second corrector 40 comprises a second oblong guide groove 43 configured to cooperate with the second hinge pin 51 so as to allow the second corrector 40 to be hinged relative to the second manual corrector actuator 50.

The second oblong groove 43 is configured to guide the movement of the second corrector 40 when the second manual corrector actuator 50 is pivoting, in a rotational and translational movement.

The second manual corrector actuator 50 comprises a second actuating stud 52 that is, for example, driven into the body of the second manual corrector actuator 50. The second actuating stud 52 allows the pushing action exerted on the second manual corrector actuator 50 by the user to be transmitted to the second corrector 40.

The cooperation between the second oblong groove 43 and the second hinge pin 51 limits the relative travel between the second manual corrector actuator 50 and the second corrector 40. The second manual corrector actuator 50 tends to be pushed back, either directly or indirectly, in a fourth direction D that is opposite the second direction C, into an inactive rest position by a second elastic return means 42, in this case constituted by a spring, although not limited thereto.

In the example embodiment shown, the second elastic return means 42 bears against the second corrector 40, and more particularly against a second spring pin 41 driven into the body of the second corrector 40. Thus, thanks to this architecture, the second elastic return means 42 makes it possible to push back, in a fourth direction D opposite the third direction C, both the second corrector 40 and the second manual corrector actuator 50 into an inactive rest position.

According to an alternative embodiment, the second elastic return means 42 could also be formed by two independent return springs, a first spring acting on the second corrector 40 and a second spring acting on the second manual corrector actuator 50.

This second corrector 40 comprises a second corrector beak 49 which is arranged to cooperate with a relief of the correction wheel assembly 10, for example a tooth 11 of the toothing of the correction wheel assembly 10. Advantageously, the second actuating stud 52 can also be arranged to constitute an abutment for limiting the angular travel of the second corrector 40.

Figure 2:
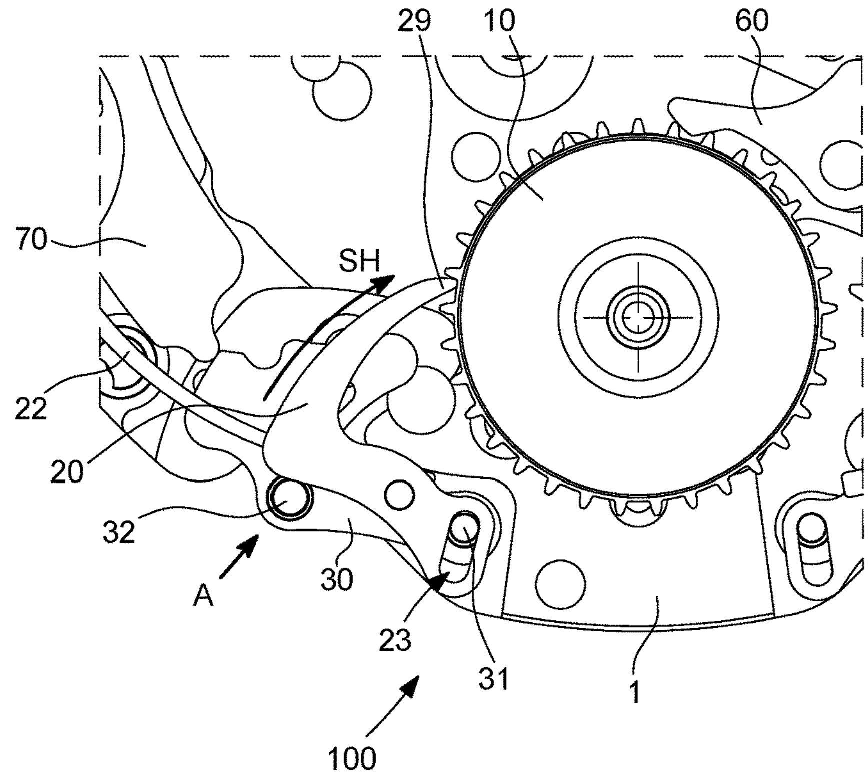
FIG. 2 diagrammatically shows a plan view of a feature of the mechanism in FIG. 1, and illustrates a first step corresponding to a push imparted by the user on a first manual corrector actuator, which drives a first corrector in a first direction (for example the clockwise direction), so as to come to bear against the bottom of the toothing on the correction wheel assembly.

FIG. 2 more particularly shows a first step corresponding to a push imparted by the user on the first manual corrector actuator 30 in the first direction A. This push causes the first corrector 20 to rotate, which pivots in the direction SH, and comes to bear against the bottom of the toothing on the correction wheel assembly 10. In the representation shown in FIG. 2, the direction SH corresponds to the clockwise direction.

Figure 3:
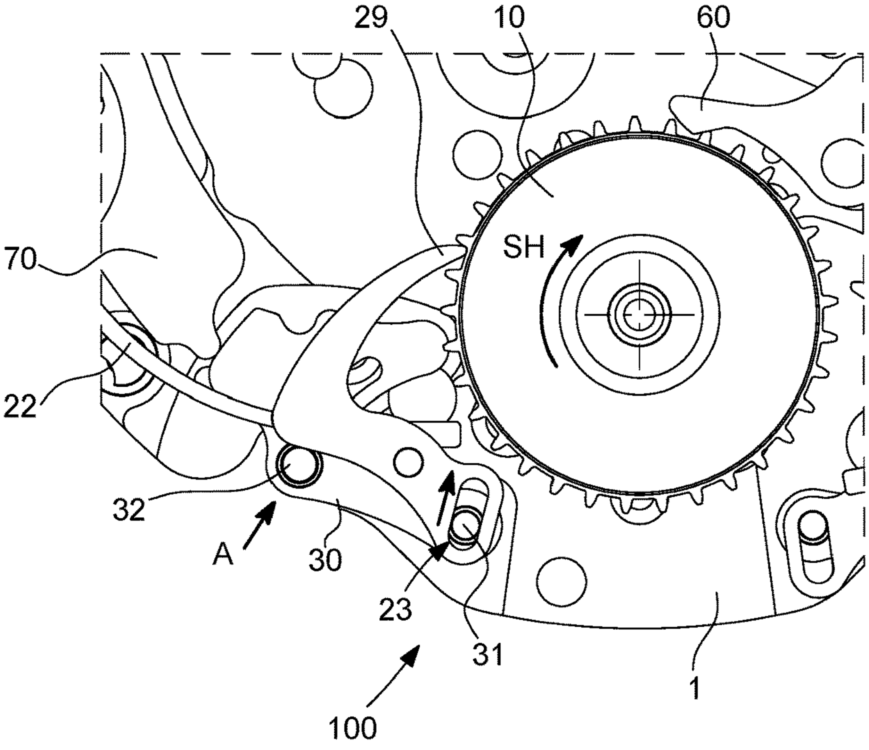
FIG. 3 shows, similarly to FIG. 2, a second step where the push is exerted on the first manual corrector actuator until it reaches a position of abutment, and during which the correction wheel assembly pivots in the first direction (clockwise direction)

FIG. 3 more particularly shows a second step which takes place when the first corrector 20 comes to bear against the bottom of the toothing on the correction wheel assembly 10. In this second step, the push is exerted so as to displace, in a substantially rectilinear manner, the first corrector 20 into a stop position of the first manual corrector actuator 30, and during which the displacement of the first corrector 20 initiates a pivoting of the correction wheel assembly 10 in the direction SH, which is the clockwise direction in the example embodiment shown.

It should be noted that in our non-limiting example embodiment, the direction of rotation of the first corrector 20 corresponds to the direction of rotation of the correction wheel assembly 10, the first corrector 20 acting directly on the correction wheel assembly 10 and not via an intermediate element or gear train.

However, an intermediate element could optionally be used between the corrector 20 and the correction wheel assembly 10 such that the rotation of the first corrector 20 drives the correction wheel assembly 10 in a direction opposite to the rotation of the first corrector 20.

Figure 4:
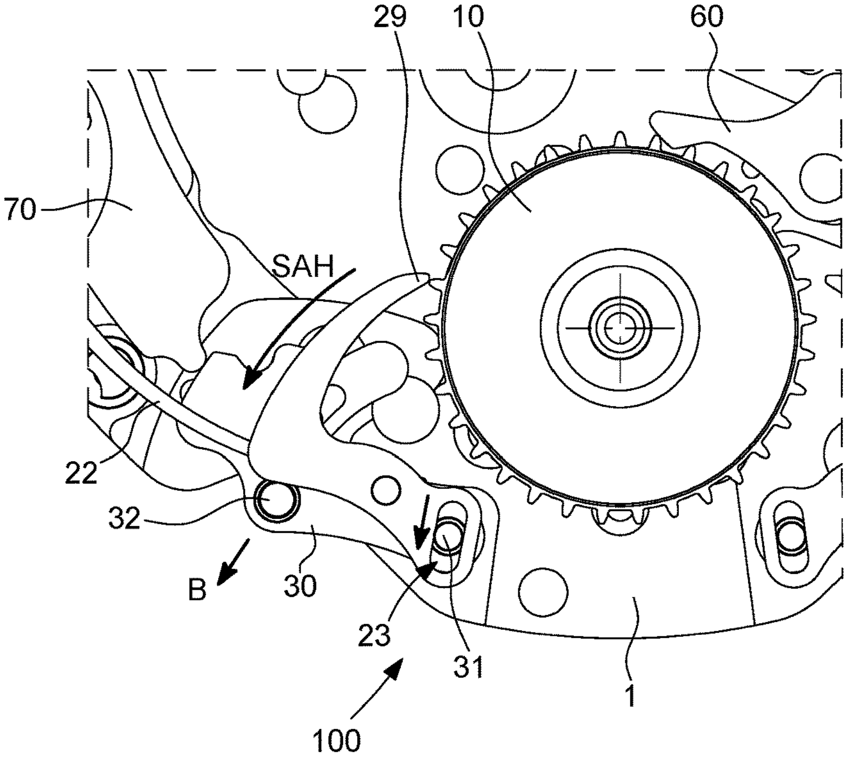
FIG. 4 shows, similarly to FIG. 2, the release, by the user, of the first manual corrector actuator, which, under the action of a first elastic return means constituted by a spring, pivots, together with the first corrector, in a second direction opposite first direction (for example the anti-clockwise direction), so as to move the beak thereof out of the toothing of the correction wheel assembly.

FIG. 4 shows a third step consisting of the release, by the user, of the first manual corrector actuator 30, which, under the action of the first elastic return means 22, pivots, together with the first corrector 20, in a second direction SAH, corresponding in this example embodiment to the anti-clockwise direction, so as to move the first beak 29 out of the toothing of the correction wheel assembly 10.

Figure 5:
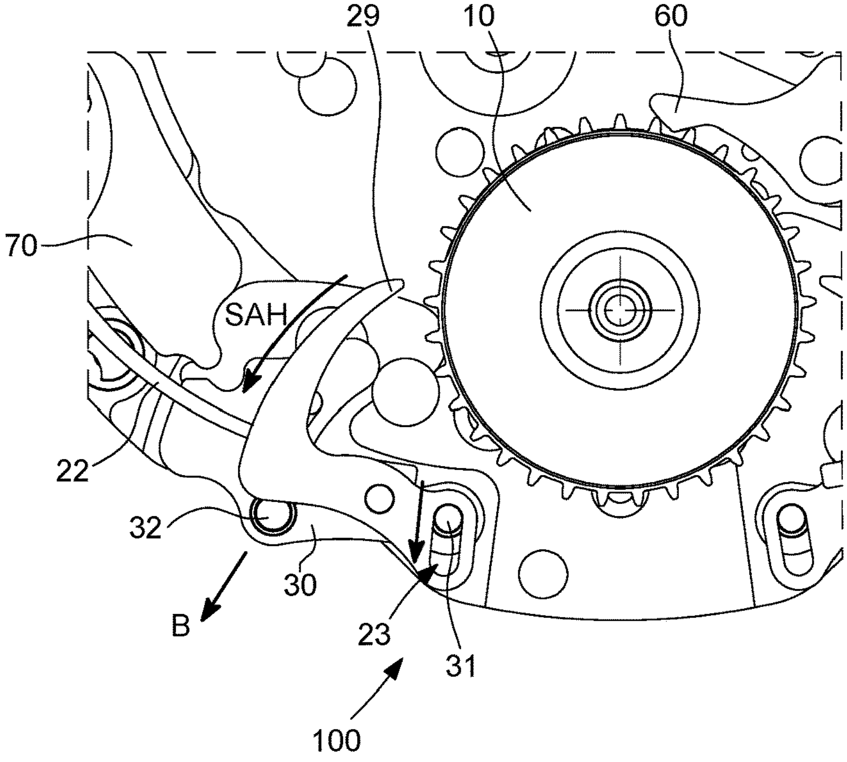
FIG. 5 shows, similarly to FIG. 2, the full release of the first manual corrector actuator, which returns to abutment in the rest position in FIG. 1.

FIG. 5 shows a fourth step corresponding to the full release of the first manual corrector actuator 30 and to the repositioning of the first manual corrector actuator 30, which returns to abutment in a rest position.

The functioning of the second manual corrector actuator 50 and of the second corrector 40 thereof is similar to the functioning of the first manual corrector actuator 30 and of the first corrector 20, as described with reference to FIGS. 2 to 5. The proposed alternative embodiments of the first manual corrector actuator 30 and its first corrector 20 are also applicable to the second manual corrector actuator 50 and to its second corrector 40.

Advantageously, the two correctors 20, 50 are counter-acting correctors that work in the same way and act on the same correction wheel assembly 10.

Advantageously, the two correctors 20, 50 act symmetrically on the same correction wheel assembly 10.

Figure 16:
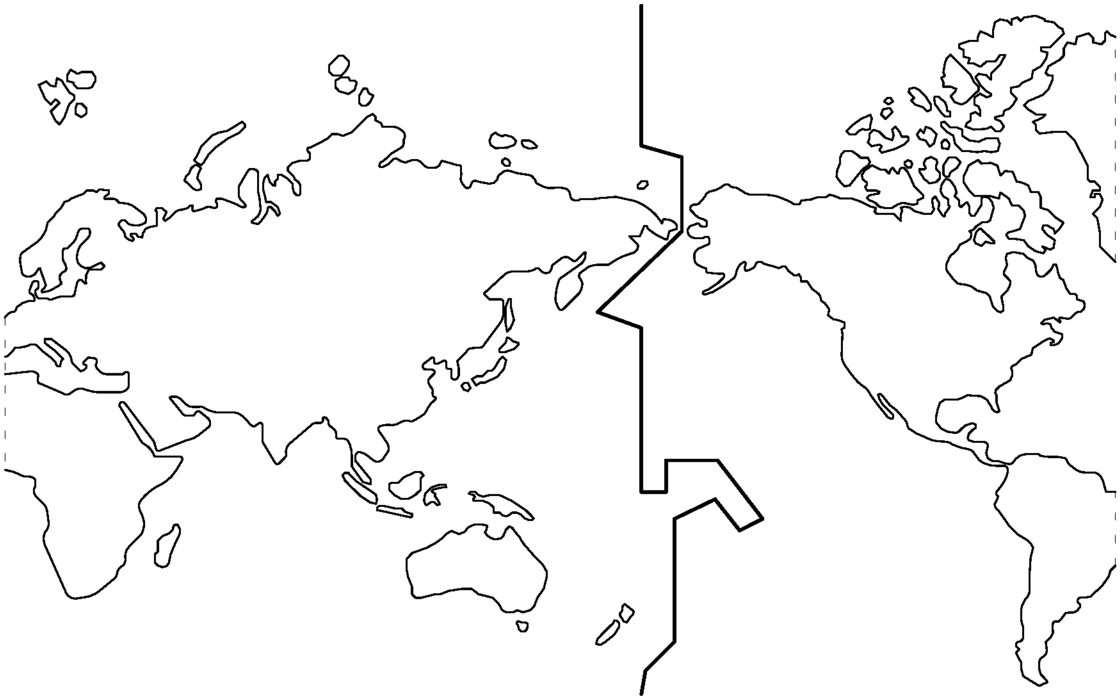
FIG. 16 is a diagrammatic example of a planisphere showing an international date line, which spans several time zones and does not follow the meridian 180° opposite the prime meridian but is guided by the geopolitical choices of the countries.

When the timepiece 1000 is equipped with a date mechanism associated with the time information display train, the date displayed can become incorrect if the wearer carries out a time zone correction while crossing the international date line (running through the Pacific Ocean), which extends over several time zones, as shown in FIG. 16.

It should be recalled that FIG. 16 is a diagrammatic example of a planisphere showing an international date line, which spans several time zones and does not follow the meridian 180° opposite the prime meridian but is guided by the geopolitical choices of the countries.

In order for the date to remain accurate, this involves preventing the wearer from making an inaccurate time zone or date correction when passing the international date line.

Figure 14:
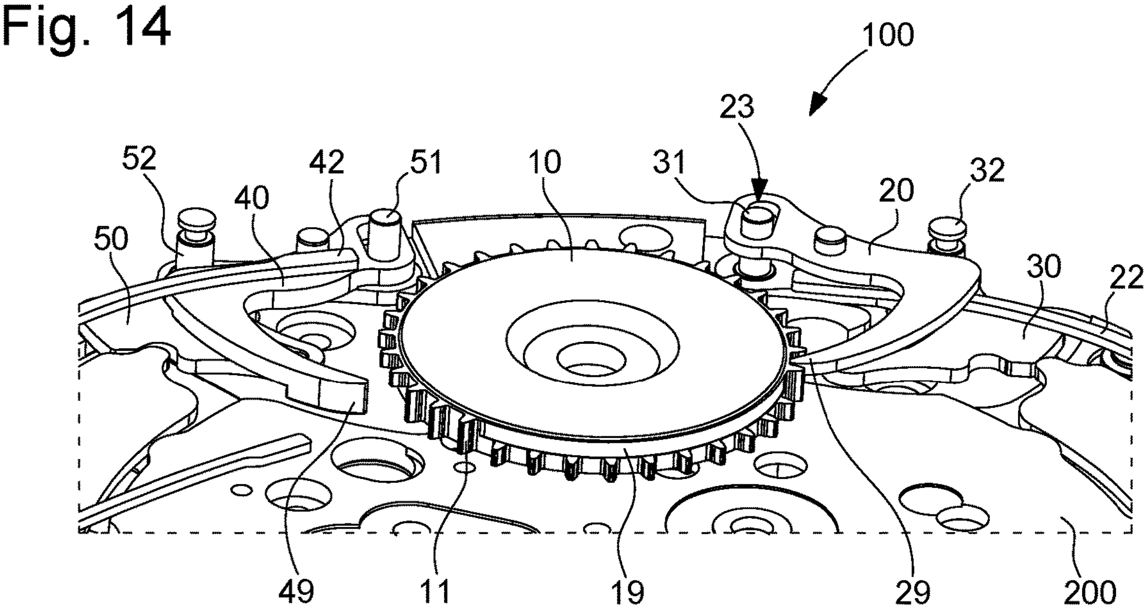
FIG. 14 diagrammatically shows a first partial and perspective view of a time zone correction mechanism according to the invention, comprising a correction wheel assembly having two drive levels that can be driven in two opposite directions by counteracting correctors operated by separate manual corrector actuators.
Figure 15:
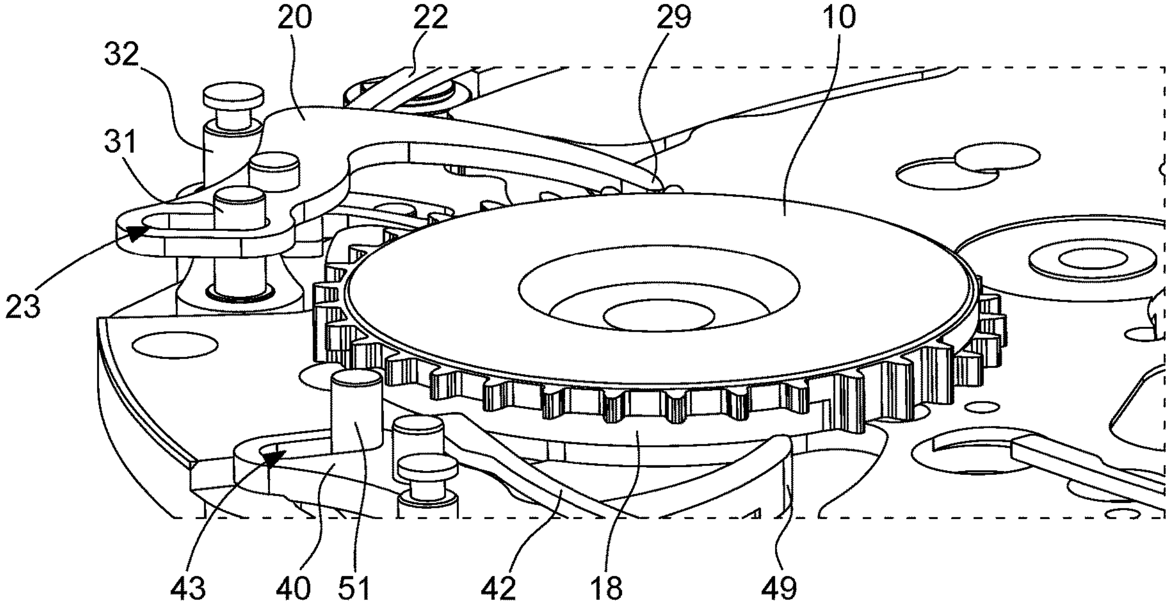
FIG. 15 diagrammatically shows a second partial and perspective view of a time zone correction mechanism according to the invention, comprising a correction wheel assembly having two drive levels that can be driven in two opposite directions by counteracting correctors operated by separate manual corrector actuators.

As shown in FIGS. 14 and 15, the present invention proposes a solution consisting of using a time zone correction mechanism 500 having a correction wheel assembly 10 constituted by a toothing with two drive levels, a first part of the toothing whereof is milled on a first, upper drive level so as to create a first clearance 19, and a second part of the toothing whereof is milled on a second, lower drive level so as to create a second clearance 18, such that the number of teeth 11 remaining, on each of the drive levels, is less than the number of time zones managed, for example 23 teeth on each drive level for 24 time zones in the case in FIGS. 14 and 15.

More particularly, the correction wheel assembly 10 is a toothed wheel assembly which comprises regularly spaced toothing, and which comprises at least one first level from which a plurality of successive teeth are missing and replaced by a first clearance 19, and at least one second level parallel to the first level and from which a plurality of successive teeth are missing and replaced by a second clearance 18.

Preferably, the first clearance 19 and the second clearance 18 are not superimposed such that they are arranged with an angular offset on the periphery of the correction wheel assembly 10. Thus, the first clearance 19 and the second clearance 18 are, when projected onto a plane, separated by a plurality of complete teeth (i.e. teeth extending over both the first and second levels) of the correction wheel assembly 10.

More particularly, at least one corrector 20, 40, acts only on a single, upper or lower, drive level of the toothing of the correction wheel assembly 10.

More particularly, each of the correctors 20, 40, is arranged to cooperate with the correction wheel assembly 10 at only one of the levels, different from that with which the other of the correctors 20, 40, cooperates.

According to the example embodiment shown in FIGS. 14 and 15, the first corrector 20 cooperates only with the upper drive level of the correction wheel assembly 10, whereas the second corrector 40 cooperates only with the lower drive level of the correction wheel assembly 10. Thus, each of the correctors 20, 40 acts only on one stage of the correction wheel assembly 10 without being able to mesh with the second stage of the correction wheel assembly 10. It goes without saying that a different disposition is possible.

In the specific, non-limiting case shown in FIGS. 14 and 15, the 23 teeth of each stage are indexed in such a way that when the time zone preceding the international date line is displayed (upstream or downstream of this line), the corrector 20, 40, allowing for the positive or negative time zone change, cannot interact with the correction wheel assembly 10 such that the international date line cannot be crossed. The only possibility of correction is thus to correct the time zones in the opposite direction to the crossing of this international date line. This allows the correct date information to be preserved.

FIGS. 14 and 15 thus show a configuration wherein the time zones have previously been corrected in the negative direction, with the second corrector 40 and the beak 49 thereof, until the international date line is reached. Negative correction is no longer possible because there are no teeth facing the beak 49 of the corrector 40 on the lower level of the correction wheel 10. Conversely, the first corrector 20, which acts to produce a positive correction, can push the first tooth 11 of the upper drive level, as shown on the right-hand side in FIG. 15.

More particularly, the first level and the second level each comprise at least one less tooth than the number of time zones managed by the timepiece 1000 that comprises the time zone correction mechanism 500.

More particularly, the first level and the second level each comprise 23 teeth when the number of time zones managed by the timepiece 1000 that comprises the time zone correction mechanism 500 is 24.

Preferably, the time zone correction wheel assembly 10 is made in one piece.

However, the time zone correction wheel assembly 10 can be made by assembling two separate elements, each of which forms a drive level, and by rigidly connecting the two elements.

The two counteracting correctors 20 and 40 work in the same way, and act on the same correction wheel assembly 10.

It should be noted that the indexing of the teeth of the correction wheel assembly 10, the positioning of the first clearance 19 and of the second clearance 18 on the periphery of the correction wheel assembly 10, as well as the angular offset between the two clearances 19, 18, mentioned in the present application are given by way of example and are linked to the non-limiting architecture of the time zone correction mechanism 500 shown in the figures. More specifically, the indexing of the teeth of the correction wheel assembly, the positioning of the clearances 19, 18 on the periphery of the correction wheel assembly 10 and the angular offset between the two clearances 19, 18 can be modified as a function of the position of the correctors 40, 20 relative to the correction wheel assembly 10 and as a function of their shape.

Advantageously, according to the invention the two correctors 20, 50 act symmetrically on the same correction wheel assembly 10.

The time zone correction mechanism 500 can further comprise a locking lever mechanism interacting with the manual control device 100 configured to neutralise two simultaneous counteracting corrections.

Thus, the locking lever mechanism is arranged to prohibit an action by one of the manual corrector actuators 30, 50, on the correction wheel assembly 10 when the other one of the manual corrector actuators 30, 50 is interacting with the correction wheel assembly 10.

For this purpose, the locking lever mechanism comprises a locking lever 70, which is arranged to be driven during a movement of one of the manual corrector actuators 30, 50, and to limit the travel of the other one of the manual corrector actuators 50, 30, and thereby prevent the corrector 40, 20 associated therewith from accessing the correction wheel assembly 10.

Advantageously, the locking lever 70 is driven such that it rotates during a movement of one of the manual corrector actuators 30, 50.

Such a locking lever 70 is mounted such that it can move in rotation about an axis perpendicular to the plate 1, and forms a safety lever to ensure that the correctors 20, 40 do not simultaneously drive the correction wheel assembly 10, for example the time zone correction wheel in our non-limiting example application.

Such a locking lever 70 is configured such that it does not prioritise a specific manual corrector actuator 30, 50 as is the case with correction mechanisms of the prior art. Thus, the time zone correction mechanism 500 according to the invention allows the manual corrector actuator actuated first by the user to be prioritised, and not a manual corrector actuator that was predefined during the design phase. The manual control device according to the invention thus allows no priority to be given to either the forward or backward corrector during the design phase.

Figure 6:
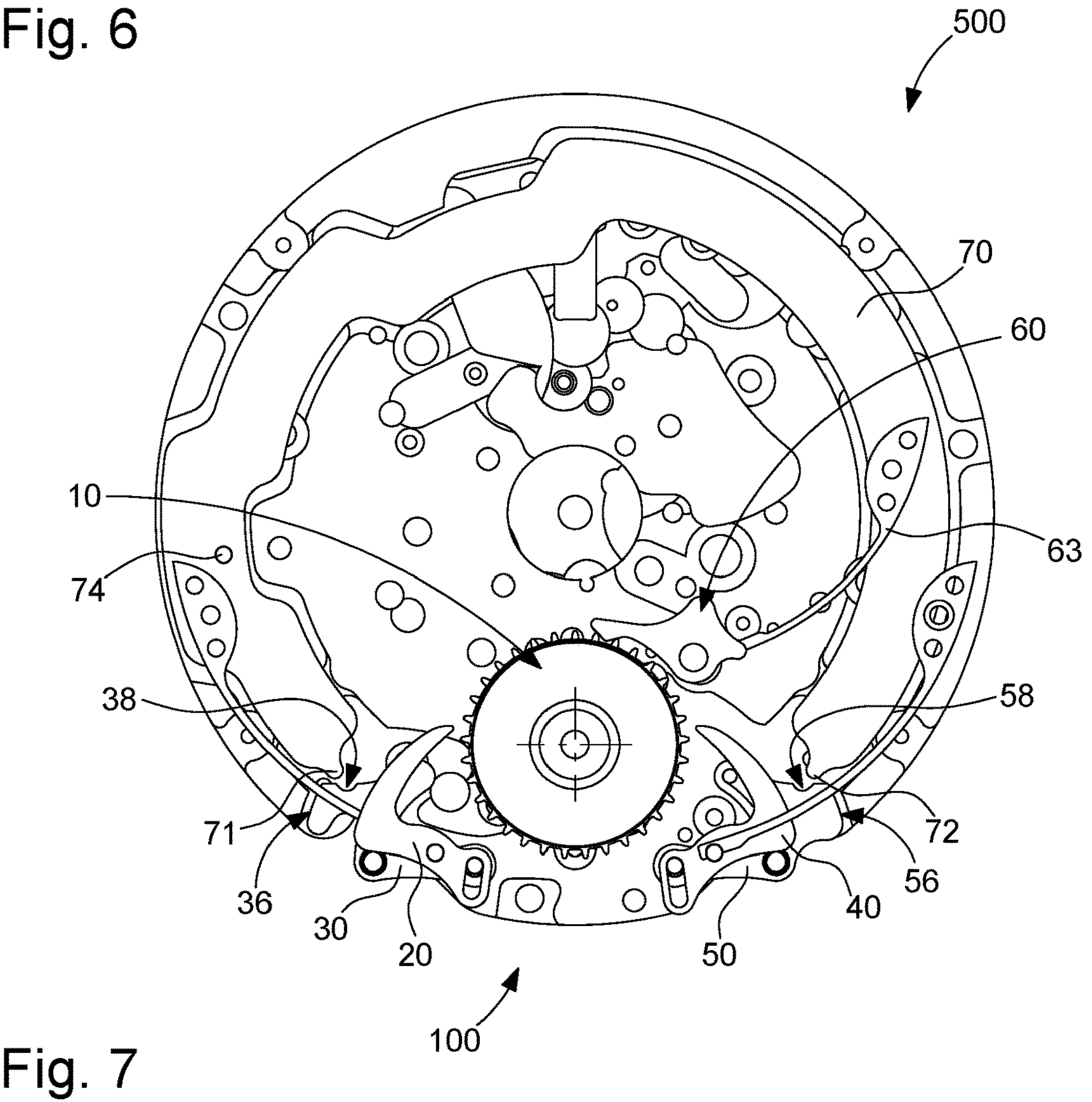
FIG. 6 diagrammatically shows a plan view, similar to FIG. 1, of a correction mechanism according to the invention, which comprises a locking lever, which is a safety lever, making it possible to ensure that the correctors do not drive the correction wheel assembly at the same time. This safety lever is, in this case, an annular sector, the distal ends whereof are arranged to cooperate with the manual corrector actuators, although it is not limited thereto.

The locking lever 70 is shown in its entirety more particularly in FIG. 6.

FIG. 6 in particular shows the manual control device 100 and the locking lever mechanism in the rest position, in the absence of any action by the user, in the same respect as in FIG. 1.

More particularly, the locking lever 70 forms a lever having, at the opposite ends thereof, stop fingers 71, 72, each of the stop fingers 71, 72 being arranged to cooperate with, while bearing thereagainst, a portion of the manual corrector actuators 30, 50.

The two opposite ends of the locking lever 70 have an identical shape and carry out the same function.

Each manual corrector actuator 30, 50 further comprises a plurality of bearing profiles allowing for interaction with the locking lever 70, and more particularly with the stop fingers 71, 72, depending on the actions of the user.

Figure 7:
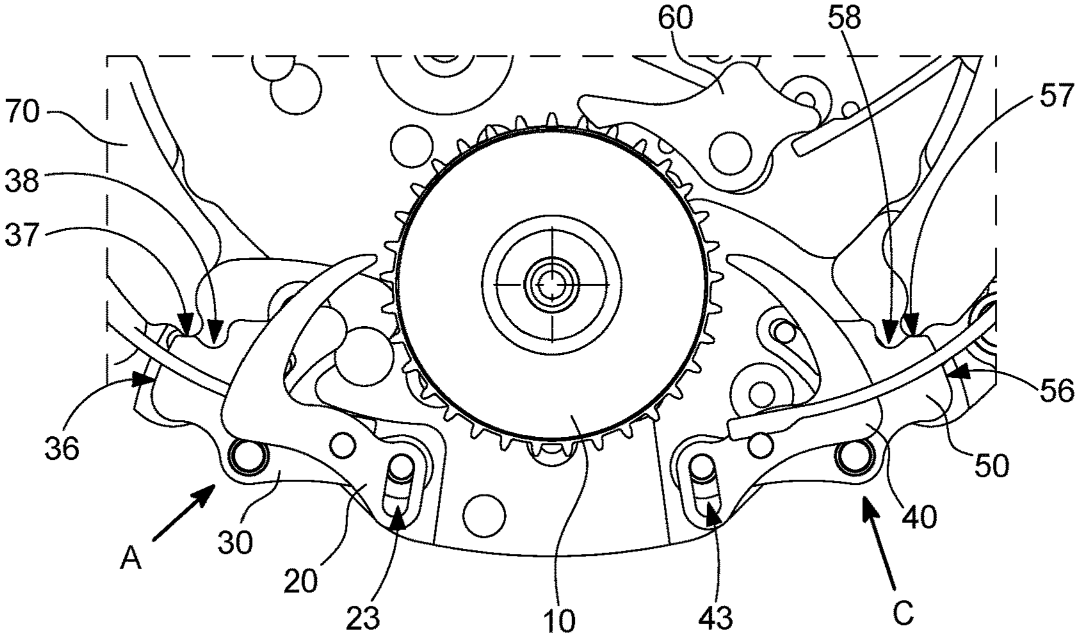
FIGS. 7 to 9 diagrammatically show a partial, plan view of the correction mechanism in FIG. 6 and illustrate the functioning thereof.
Figure 8:
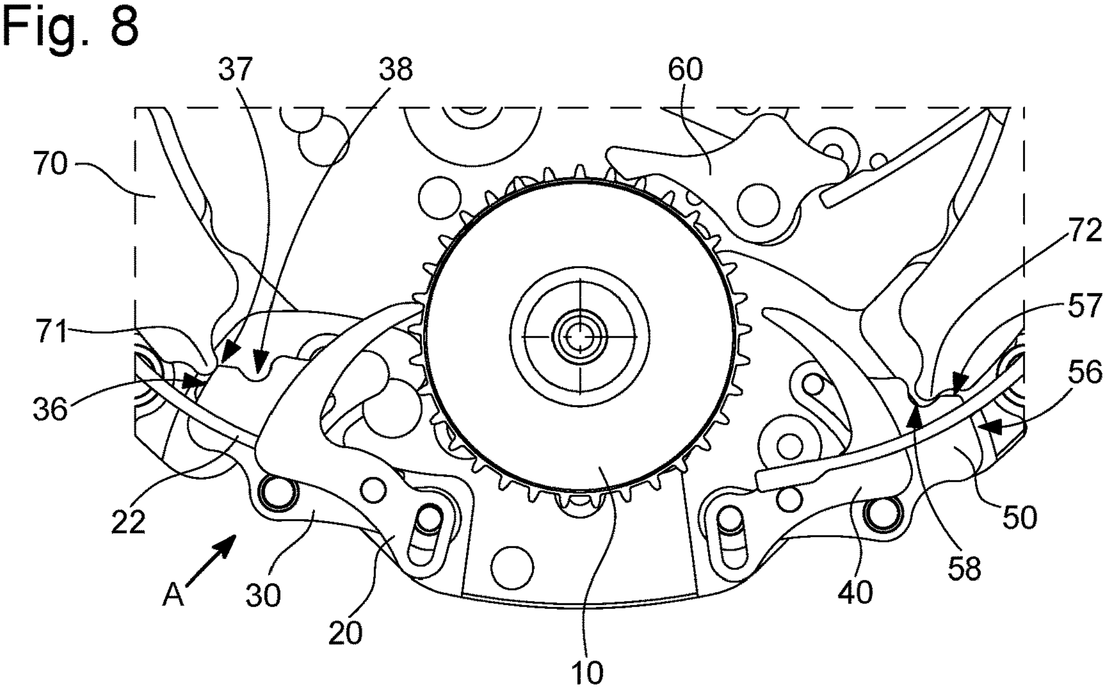
Figure 9:
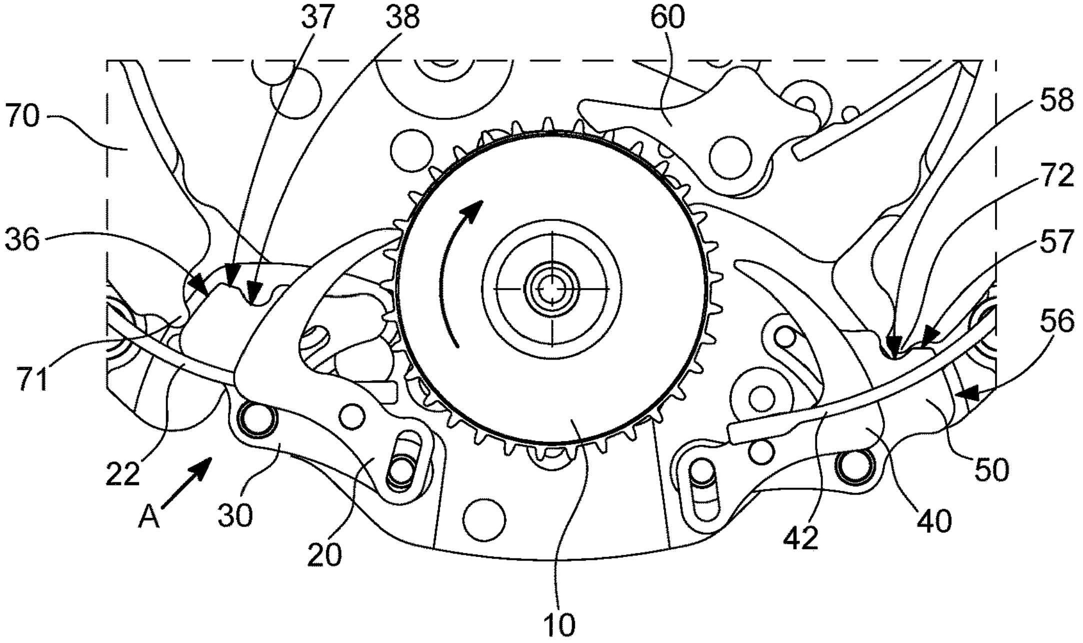

As shown in FIGS. 7 to 9, each manual corrector actuator 30, 50 comprises a first bearing profile 37, 57 configured to form a stop profile of the manual corrector actuator 30, 50, the first bearing profile 37, 57 being configured to cooperate respectively with a stop finger 71, 72 of the locking lever 70.

Each manual corrector actuator 30, 50 comprises a second bearing profile 36, 56 configured to form an escapement profile, or a sliding profile, on which the stop finger 71, 72 of the locking lever 70 slides, so as to allow a manual corrector actuator 30, 50 to at least partially rotate when the counteracting manual corrector actuator 30, 50 is not simultaneously actuated, as shown more particularly in FIGS. 8 to 9.

When the user operates the manual corrector actuators 30, 50, two cases can occur.

In the first case, as shown in FIG. 7, the manual corrector actuators 30, 50 are actuated simultaneously by the user. When the manual corrector actuators 30 and 50 are actuated simultaneously, they simultaneously come into contact with the stop fingers 71, 72 of the locking lever 70 at the first bearing profile 37, 57. Thus, the first bearing profiles 37, 57 simultaneously bear against a stop finger 71, 72 of the locking lever 70. As each manual corrector actuator 30, 50 exerts an opposite and identical action to the other on the locking lever 70 that is capable of moving in rotation, the locking lever 70 cannot rotate.

As a result of this simultaneous action on the two manual corrector actuators 30, 50, the only way to achieve a correction is to release one of the manual corrector actuators 30, 50 to allow the locking lever 70 to tip.

In this way, the locking lever mechanism prevents the two corrector beaks 29 and 49 from interacting with the correction wheel assembly 10 when they are activated at the same time by the user, via the manual corrector actuators 30, 50.

Advantageously, the stop fingers 71, 72 have an identical first shape and the first bearing profiles 37, 57 have an identical second shape such that the forces exerted on the locking lever 70 via the manual corrector actuators 30, 50 are substantially equivalent.

In the second case, as shown in FIG. 8, the user actuates only one of the manual corrector actuators 30, 50 at a time.

In the example embodiment shown in FIG. 8, the first manual corrector actuator 30 is actuated. As seen hereinabove, this first manual corrector actuator 30 actuates the corrector 20, which acts in the direction of a clockwise correction, until the corrector beak 29 comes into contact with a tooth 11 of the toothing of the correction wheel assembly 10.

The rotation of the manual corrector actuator 30 causes the first bearing profile 37 to make contact with the first finger 71 of the locking lever, then causes the locking lever 70 to rotate over its maximum travel.

Advantageously, the bearing profiles 37, 36 of the manual corrector actuator 30 are configured such that the maximum travel of the locking lever 70 is reached before the corrector beak 29 comes into contact with the toothing of the correction wheel assembly 10.

Once tilted, the locking lever 70 is held in the tilted position by the second bearing profile 36. In the tilted position, the distance between the lever 70 and the second manual corrector actuator 50 is very small, which prevents the rotation thereof and of the second corrector 40, and thus the actuation of the second manual corrector actuator 50 once the first manual corrector actuator 30 is engaged. A small amount of play can be possible.

If the user continues to push the first manual corrector actuator 30 until it abuts, as shown in FIG. 9, this action drives the correction wheel assembly in the clockwise direction. The safety lever 70 remains in the same tilted position while sliding along the second bearing profile 36, and prevents the rotation of the second manual corrector actuator 50. Thus, via the locking lever 70 acting as a safety lever, the two corrector beaks 29 and 49 cannot interact with the correction wheel assembly 10 at the same time, and no corrector is prioritised during the design phase.

Depending on the geometry and complexity of the mechanism, the manual corrector actuators 30, 50 can have a clearance 38, 58 to free up space opposite the fingers 71, 72 of the locking lever 70, thus allowing the locking lever 70 to be able to tilt and reach maximum travel.

In the case of the time zone correction mechanism 500 carrying out a correction by way of push buttons as presented hereinabove and shown in the figures, such a locking lever 70 is added, which is a safety lever ensuring that the correctors do not drive the wheel assembly 10, which in this case is the time zone correction wheel, at the same time.

In an alternative embodiment, the locking lever 70 is in one piece.

In an alternative embodiment, the locking lever 70 is made of a plurality of parts that are hinged to one another.

In yet another alternative embodiment, the locking lever 70 is made of a plurality of parts, which are arranged to bear against one another upon an action of a user on one of the manual corrector actuators 30, 50.

Figure 11:
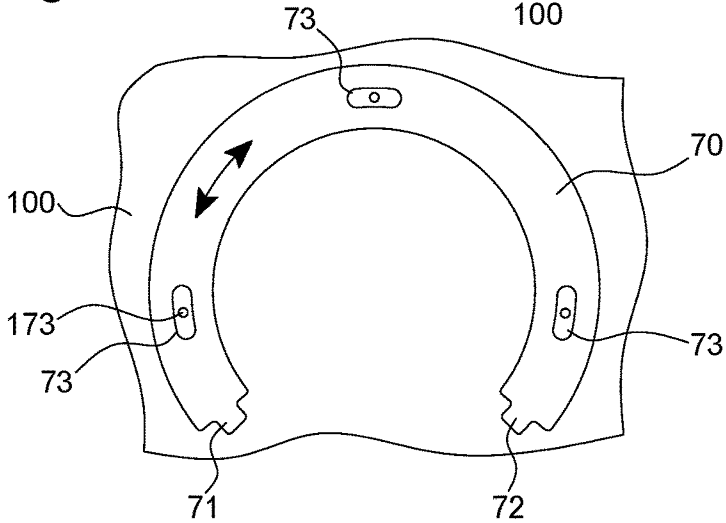
FIG. 11 diagrammatically shows a plan view of one example embodiment of a safety lever according to the invention with guidance by pins and oblong grooves.

In an alternative embodiment shown in FIG. 11, the locking lever 70 comprises lever guide grooves 73 cooperating with lever guide pins 173 carried by the plate 1 carrying the manual control device 100.

According to another alternative embodiment, the locking lever comprises lever pins which cooperate with lever pin guide grooves made in the plate 1 carrying the manual control device 100.

Figure 12:
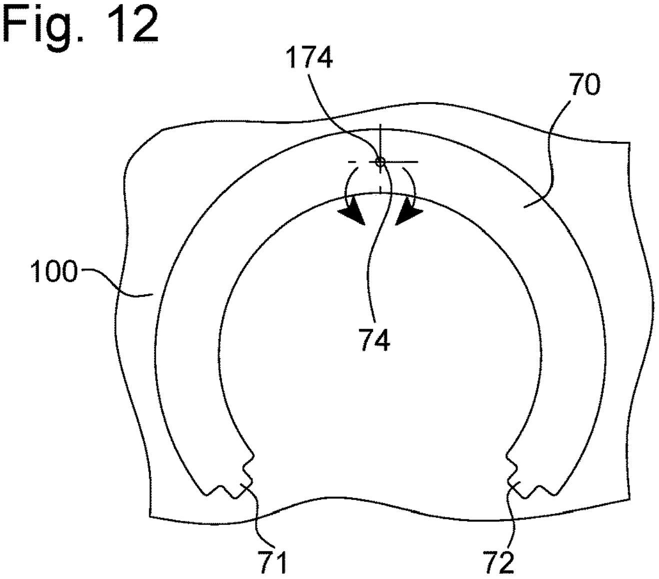
FIG. 12 diagrammatically shows a plan view of one example embodiment of a safety lever according to the invention that pivots.

According to another alternative embodiment shown in FIG. 12, the locking lever 70 is mounted such that it pivots about a shaft 174 mounted on the plate 1 carrying the manual control device 100.

The locking lever 70 can also be used to initiate one or more additional functions during the tilting of the locking lever 70. In particular, as shown in FIGS. 1 and 6, the locking lever 70 can comprise a coupling pin 74 integral with the movements of the locking lever 70. This coupling pin 74 is in particular arranged to move an additional wheel assembly, for example a coupling wheel assembly, to move a lever provided with an idler gear, to couple the correction mechanism with the hands of the timepiece, or to uncouple same, during the movement of the locking lever 70 initiated during a correction.

Figure 10:
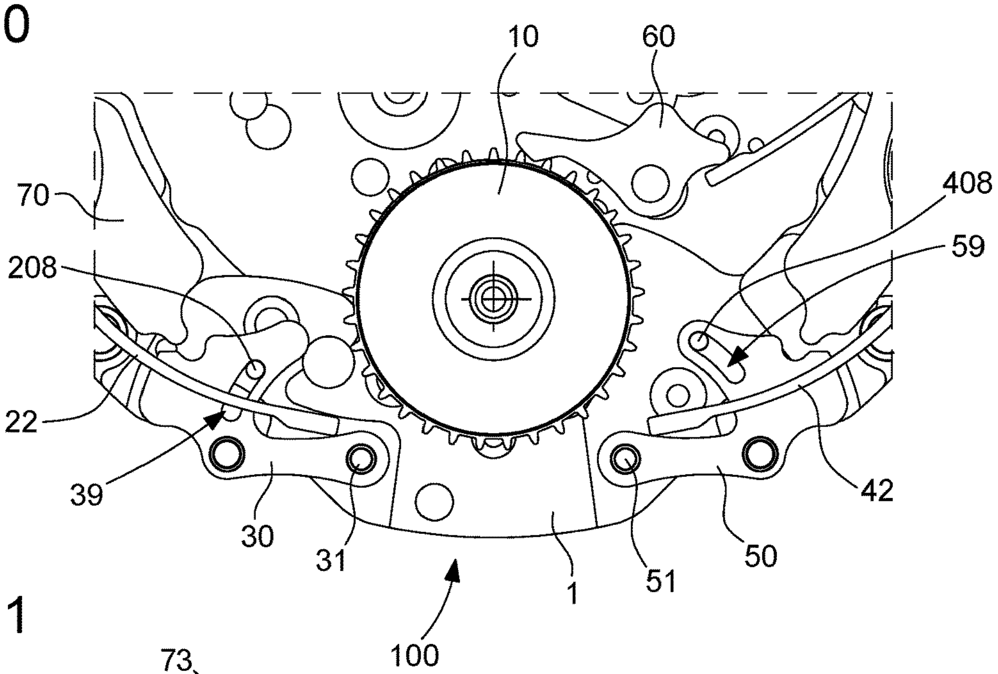
FIG. 10 diagrammatically shows a plan view, similar to FIG. 1, of a correction mechanism according to the invention in a rest position without the correctors so as to more specifically view the manual corrector actuators.

Each manual corrector actuator 30, 50 comprises a limiting member for limiting the angular travel. The manual control device 100 according to the invention has been shown with reference to FIG. 10 without the previously described correctors 20, 40 for better visibility. More particularly, the limiting member for limiting the angular travel is formed by a limiting groove 39, 59 made in the body of the manual corrector actuator 30, 40 and by a limiting pin 208, 408 carried by the plate 1 carrying the manual control device 100. The limiting groove 39, 59 cooperates with the limiting pin 208, 408 as follows: in the rest position, under the influence of the first elastic return means 22 or of the second elastic return means 42, the limiting groove 39, 59 bears against the limiting pin 208, 408 at a first end of the limiting groove 39, 59. The maximum rotational travel of the manual corrector actuator 30, 50 is defined by the second end of the limiting groove 39, 59 abutting against the limiting pin 208, 408 under the push initiated by the user.

The inactive rest position of each of the manual corrector actuators 30, 50 is outside the timepiece 1000. These manual corrector actuators 30, 50 thus remain within the reach of the user.

More particularly, the manual corrector actuators 30, 50 are actuated by means of push buttons provided in the middle (not shown) of the timepiece 1000.

The invention has been described for a time zone correction mechanism; however, the invention is also applicable to many other horological mechanisms, for which an adjustment must be made or is advantageously made by the user, for example, in a non-limiting manner, the setting of a moon phase or age, tide status, leap year, day/night position, morning/evening position, manual counter, the selection of a striking mode, or the adjustment of an alarm time, or the like.

In the advantageous alternative embodiment wherein the time zone correction mechanism 500 is associated with a date mechanism in the timepiece 1000, it is clear that the time zone correction mechanism, modifying the position of the time zone hour train, also acts on the positioning of the date mechanism thus resulting in a change of date if necessary, as a function of the time zone setting without, however, allowing the international date line to be crossed in order to prevent the date setting from becoming incorrect.

Furthermore, in order to set the date independently of the time zone hour train or hour gear train, in particular when the watch is stopped, an independent date setting mechanism, which is well known to a person skilled in the art, must be installed. The installation of such a date setting mechanism is within the scope of the general knowledge of a person skilled in the art and does not need to be described in more detail herein.

The solution presented is particularly well adapted for 24 time zones. However, the invention is not limited to this specific application because, since the international date line is not a straight line, the +13 (Tonga/Samoa), +14 (Kiribati Christmas Island) and −12 (Baker Island) time zones can also be considered.

An alternative embodiment of the invention can also take into account the states concerned by half-hour time zones, such as India, Pakistan, or Nepal, with for example a mechanism with 48 half-hour time zones; it goes without saying that the display on the watch must be adapted accordingly, for example by displaying 30 minutes over 360°, and by displaying 24 half-hours over 360°. Such an implementation, on reading the present application, is within the scope of the general knowledge of a person skilled in the art without requiring any inventive step.

When the time zone correction push buttons are actuated at the same time, there is no risk of the mechanism breaking thanks to the use of the locking lever mechanism.

Thanks to the invention, if a date is associated with the time zone correction mechanism, the accuracy of the date is guaranteed, regardless of the actions carried out by the wearer on the correctors.

The invention claimed is:

1. A time zone correction mechanism, for a timepiece, equipped with a manual control device comprising two counteracting manual corrector actuators, arranged to be operated by a user and to control movements of one and the same time zone correction wheel assembly in opposite directions, each of the two manual corrector actuators setting in motion a time zone corrector associated therewith comprising a beak which is configured to bear against a relief of said time zone correction wheel assembly and to cause said time zone correction wheel assembly to move over a full path of travel of said manual corrector actuator under an action of the user, wherein said time zone correction wheel assembly is a toothed wheel assembly comprising a regularly spaced toothing having a first drive level from which a plurality of successive teeth are missing and replaced by a first clearance, and a second drive level parallel to said first drive level, and from which a plurality of successive teeth are missing and replaced by a second clearance, wherein said first clearance and said second clearance are not superimposed with one another, and wherein each time zone corrector is configured to cooperate with a single drive level, from among the first drive level and the second drive level, of the time zone correction wheel assembly.

2. The time zone correction mechanism according to claim 1, wherein said first clearance and said second clearance are, when projected onto a plane, separated by a plurality of complete teeth of said time zone correction wheel assembly which extend over both said first drive level and said second drive level.

3. The time zone correction mechanism according to claim 1, wherein a first time zone corrector, associated with a first manual corrector actuator, is configured to cooperate with said time zone correction wheel assembly at the first drive level and wherein a second time zone corrector associated with a second manual corrector actuator is configured to cooperate with said time zone correction wheel assembly at the second drive level.

4. The time zone correction mechanism according to claim 1, wherein said first drive level and said second drive level of the time zone correction wheel assembly each comprise at least one less tooth than a number of time zones managed by the timepiece that comprises said time zone correction mechanism.

5. The time zone correction mechanism according to claim 4, wherein said first drive level and said second drive level of the time zone correction wheel assembly each comprise 23 teeth when the number of time zones managed by the timepiece that comprises said time zone correction mechanism is 24.

6. The time zone correction mechanism according to claim 1, wherein said time zone correction wheel assembly is made in one piece.

7. The time zone correction mechanism according to claim 1, wherein said manual control device comprises a locking lever mechanism arranged to prohibit an action by one of the two manual corrector actuators on said time zone correction wheel assembly when the other one of the two manual corrector actuators is engaged and interacting with said time zone correction wheel assembly.

8. The time zone correction mechanism according to claim 7, wherein said locking lever mechanism comprises a locking lever configured to be driven in rotation during the engagement of one of the two manual corrector actuators, to limit the travel of the other one of the two manual corrector actuators, and to prevent the time zone corrector associated therewith from accessing said time zone correction wheel assembly.

9. The time zone correction mechanism according to claim 8, wherein said locking lever constitutes a safety lever, said locking lever comprising a first end having a first stop finger and a second end, opposite the first end, which has a second stop finger, the first and the second stop fingers being configured to cooperate in abutment, respectively with a manual corrector actuator from among the two manual corrector actuators.

10. The time zone correction mechanism according to claim 9, wherein the first stop finger and the second stop finger have an identical shape and/or carry out an identical function.

11. The time zone correction mechanism according to claim 9, wherein each of the two manual corrector actuators comprises:

a first bearing profile configured to form a stop profile in cooperation with the first stop finger or the second stop finger and to prevent said manual corrector actuator considered from rotating;

a second bearing profile configured to form an escapement profile on which the first stop finger or the second stop finger slides so as to allow said manual corrector actuator considered to partially rotate.

12. The time zone correction mechanism according to claim 11, wherein said first bearing profiles of the two manual corrector actuators are arranged relative to one another in a substantially aligned manner, and wherein the first stop finger and the second stop finger respectively bear against said first bearing profile of each of said two manual corrector actuators when each of said two manual corrector actuators are actuated simultaneously by the user.

13. The time zone correction mechanism according to claim 11, wherein said second bearing profiles of said two manual corrector actuators are arranged opposing one another so as to form an acute angle with a vertex of the acute angle pointing towards the time zone correction mechanism.

14. A timepiece comprising at least one time zone mechanism with the time zone correction mechanism according to claim 1.

15. The timepiece according to claim 14, wherein said timepiece comprises a date mechanism comprising a date wheel assembly and a mechanism for displaying time information.

* * * * *